(12) United States Patent
Lee et al.

(10) Patent No.: US 10,862,180 B2
(45) Date of Patent: Dec. 8, 2020

(54) BATTERY MODULE AND BATTERY PACK INCLUDING SAME

(71) Applicant: LG CHEM, LTD., Seoul (KR)

(72) Inventors: Gang-U Lee, Daejeon (KR); Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/334,240

(22) PCT Filed: Jul. 5, 2018

(86) PCT No.: PCT/KR2018/007653
§ 371 (c)(1),
(2) Date: Mar. 18, 2019

(87) PCT Pub. No.: WO2019/013492
PCT Pub. Date: Jan. 17, 2019

(65) Prior Publication Data
US 2019/0229385 A1    Jul. 25, 2019

(30) Foreign Application Priority Data
Jul. 11, 2017 (KR) .......... 10-2017-0087940

(51) Int. Cl.
*H01M 10/655* (2014.01)
*H01M 10/6556* (2014.01)
*B60K 6/28* (2007.10)
*B60L 50/64* (2019.01)
*H01M 10/613* (2014.01)
(Continued)

(52) U.S. Cl.
CPC ........... *H01M 10/6556* (2015.04); *B60K 6/28* (2013.01); *B60L 50/64* (2019.02); *H01M 2/10* (2013.01); *H01M 2/1077* (2013.01); *H01M 10/482* (2013.01); *H01M 10/613* (2015.04); *H01M 10/625* (2015.04); *H01M 10/647* (2015.04); *H01M 10/655* (2015.04);
(Continued)

(58) Field of Classification Search
CPC ......... H01M 10/6556; H01M 10/6567; H01M 10/6554; H01M 10/647; H01M 2/10; H01M 10/655; H01M 10/613; H01M 10/482; H01M 2/1077; H01M 10/625; H01M 2220/20; B60K 6/28; B60L 50/64; B60Y 2200/91; Y02E 60/12
See application file for complete search history.

(56) References Cited

U.S. PATENT DOCUMENTS

2011/0305935 A1    12/2011  Yoon
2012/0064377 A1    3/2012   Ro
(Continued)

FOREIGN PATENT DOCUMENTS

CN        206022458 U       3/2017
DE    10 2008 010 820 A1    8/2009
(Continued)

OTHER PUBLICATIONS

International Search Report (PCT/ISA/210) issued in PCT/KR2018/007653, dated Oct. 25, 2018.

*Primary Examiner* — Cynthia K Walls
(74) *Attorney, Agent, or Firm* — Birch, Stewart, Kolasch & Birch, LLP

(57) ABSTRACT

A battery module includes: a battery cell stack having a plurality of battery cells stacked; a case configured to accommodate the battery cell stack; and a heat dissipation member inserted into the case and supported in contact with the battery cell stack.

12 Claims, 4 Drawing Sheets

(51) Int. Cl.
  *H01M 10/48* (2006.01)
  *H01M 2/10* (2006.01)
  *H01M 10/625* (2014.01)
  *H01M 10/6567* (2014.01)
  *H01M 10/6554* (2014.01)
  *H01M 10/647* (2014.01)

(52) U.S. Cl.
  CPC ... *H01M 10/6554* (2015.04); *H01M 10/6567* (2015.04); *B60Y 2200/91* (2013.01); *H01M 2220/20* (2013.01)

(56) References Cited

U.S. PATENT DOCUMENTS

| | | |
|---|---|---|
| 2012/0171544 A1 | 7/2012 | Gutsch et al. |
| 2013/0149576 A1 | 6/2013 | Lee et al. |
| 2016/0087319 A1 | 3/2016 | Roh et al. |
| 2016/0222631 A1 | 8/2016 | Kohno et al. |

FOREIGN PATENT DOCUMENTS

| | | |
|---|---|---|
| DE | 10 2011 075 820 A1 | 11/2012 |
| DE | 10 2013 016 620 A1 | 4/2015 |
| DE | 10 2016 009 969 A1 | 2/2017 |
| JP | 2008-251262 A | 10/2008 |
| JP | 2010-70011 A | 4/2010 |
| JP | 4494719 B2 | 6/2010 |
| JP | 2012-43757 A | 3/2012 |
| JP | 2015-138589 A | 7/2015 |
| KR | 10-1084224 B1 | 11/2011 |
| KR | 10-1106094 B1 | 1/2012 |
| KR | 10-2012-0028303 A | 3/2012 |
| KR | 10-2013-0054761 A | 5/2013 |
| KR | 10-2013-0086018 A | 7/2013 |
| KR | 10-2017-0021561 A | 2/2017 |

BATTERY MODULE AND BATTERY PACK INCLUDING SAME

TECHNICAL FIELD

The present application claims priority to Korean Patent Application No. 10-2017-0087940 filed on Jul. 11, 2017 in the Republic of Korea, the disclosures of which are incorporated herein by reference.

The present disclosure relates to a battery module and a battery pack including the battery module, and more particularly, to a battery module in which a heat dissipation member may be fixed without a coupling member.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

A conventional battery module uses a heat dissipation member such as a heatsink contacting the battery cell in order to emit heat from the battery cell. However, since the heatsink contacts the battery cell after the battery cell is accommodated in the case, a coupling member such as a bolt and nut is needed to fix the heatsink.

DISCLOSURE

Technical Problem

The present disclosure is designed to solve the problems of the related art, and therefore the present disclosure is directed to providing a battery module in which a heat dissipation member may be fixed in contact with a battery cell without a coupling member such as a bolt and nut, and a battery pack including the battery module.

In addition, the present disclosure is directed to providing a battery module in which the heat dissipation member may be accurately inserted into the case, and a battery pack including the battery module.

Technical Solution

In one aspect of the present disclosure, there is provided a battery module, comprising: a battery cell stack having a plurality of battery cells stacked; a case configured to accommodate the battery cell stack; and a heat dissipation member inserted into the case and supported in contact with the battery cell stack.

Also, at least one insert hole may be formed in the case, and the heat dissipation member may include: a base plate; and at least one protrusion coupled to the base plate and inserted into the at least one insert hole.

In addition, the base plate may be inserted into the case and contact one side of the case at which the at least one insert hole is formed.

Also, a first side of the base plate may be in contact with the case, and a second side of the base plate opposite to the first side may be in contact with the battery cell stack.

In addition, in the heat dissipation member the at least one protrusion may include at least two protrusions, a coolant inlet may formed at a first protrusion of the at least two protrusions and connected to an inflow channel so that a coolant flows into the base plate, and a coolant outlet may be formed at a second protrusion of the at least two protrusions and connected to an outflow channel so that the coolant flows out from the base plate.

Also, the at least one protrusion may be inserted into the at least one insert hole and coupled to the case by hooking or snap-fitting.

In addition, at least one step may be formed at the at least one protrusion, a hooking groove may be formed at the step, and a hook may be formed at the case so as to be coupled to the hooking groove.

Also, at least one guide protrusion may be formed at the case, and at least one guide hole may be formed in the base plate to guide the base plate to be inserted along the guide protrusion.

Meanwhile, in another aspect of the present disclosure, there is also provided a battery pack including the battery module described above, and there is also provided a vehicle including the battery module.

Advantageous Effects

According to embodiments of the present disclosure, since the heat dissipation member may be supported by the battery cell stack and the protrusion may be coupled to the case by hooking or snap-fitting, the heat dissipation member may be fixed in contact with the battery cell without a coupling member such as a bolt and nut.

In addition, since the heat dissipation member is inserted along the guide protrusion formed at the case, the heat dissipation may be accurately inserted into the case.

BEST MODE

Figure 1:
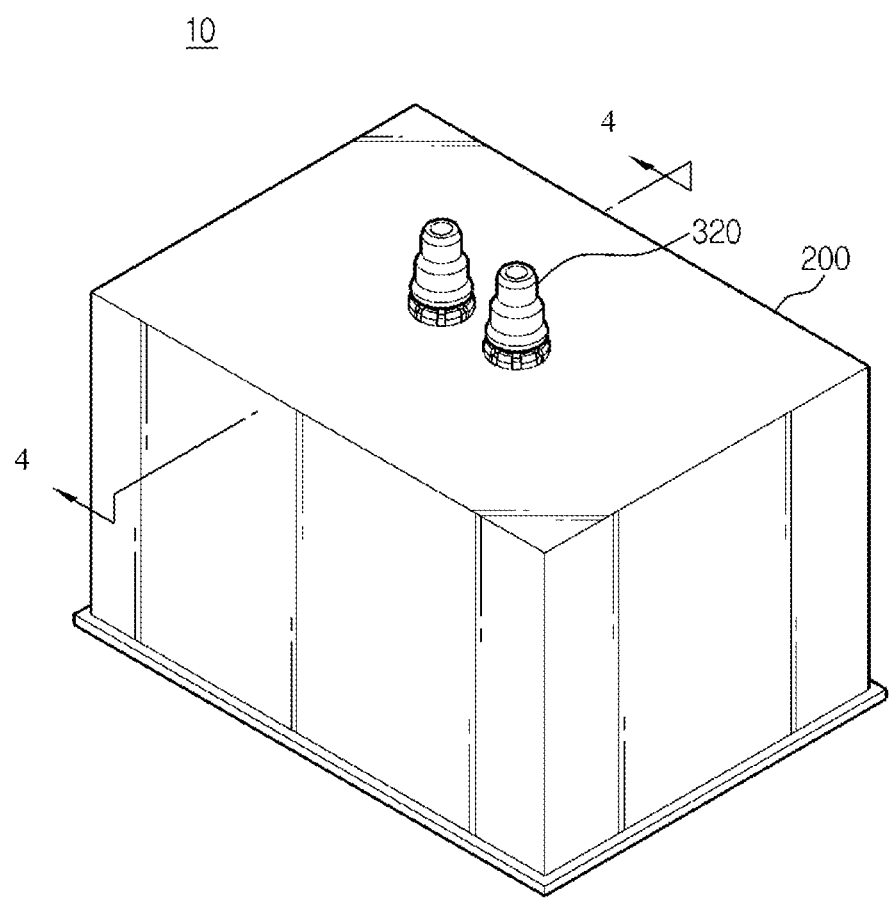
FIG. 1 is a schematic perspective view showing an entire battery module according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
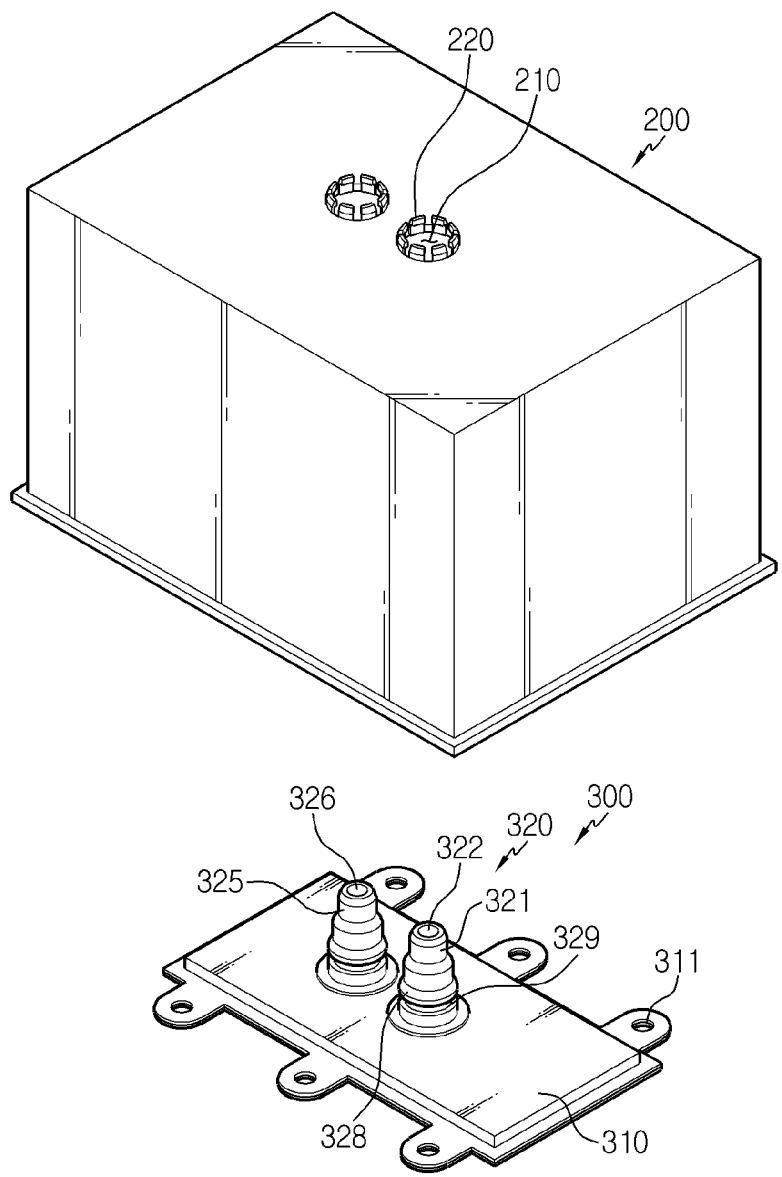
FIG. 2 is a schematic exploded perspective view showing the battery module according to an embodiment of the present disclosure.
Figure 3:
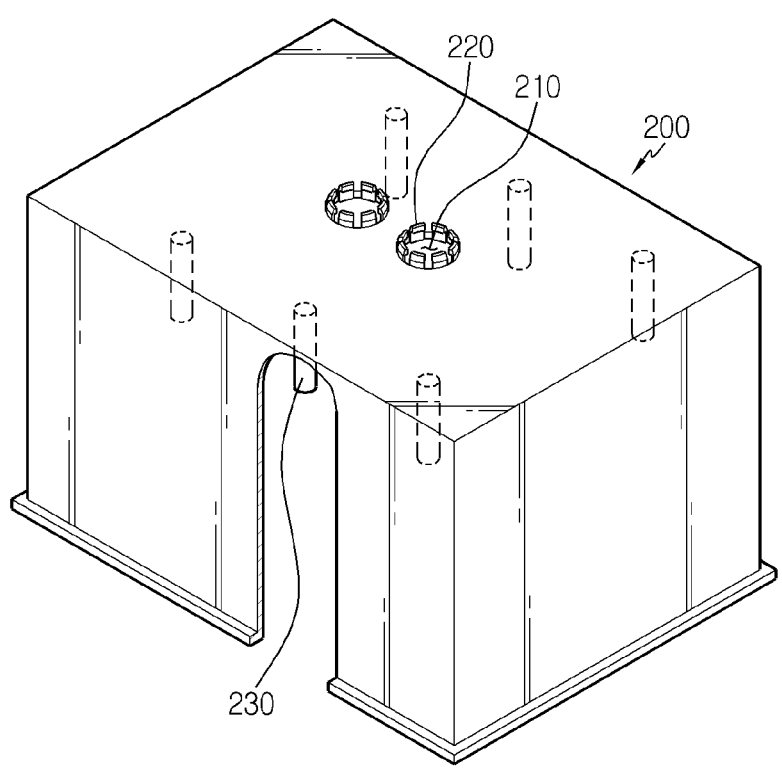
FIG. 3 is a diagram showing an interior of a case in the battery module according to an embodiment of the present disclosure.
Figure 4:
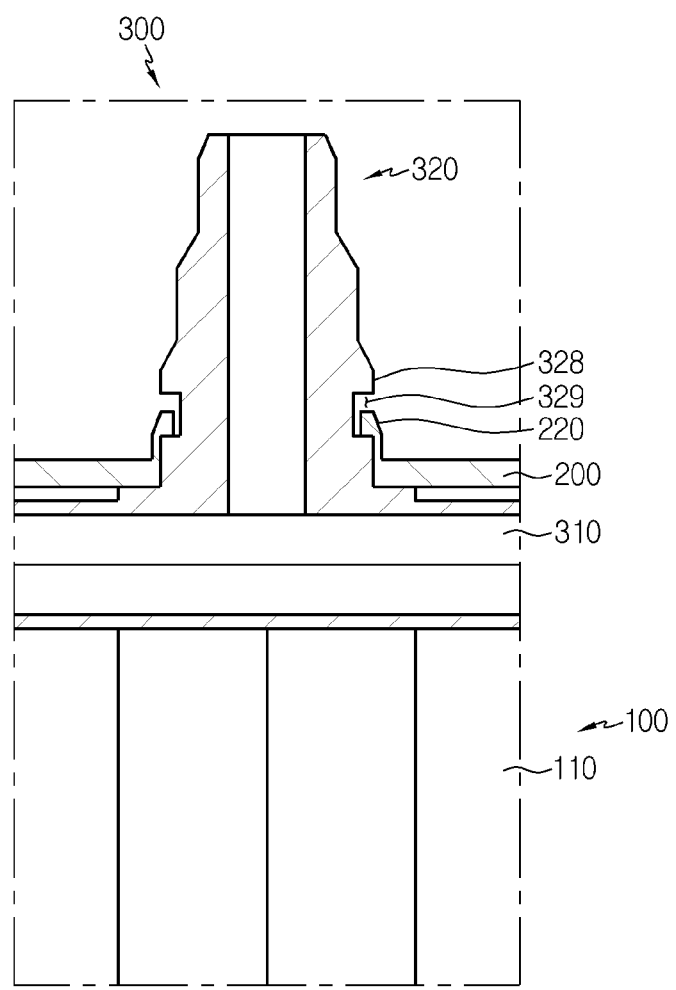
FIG. 4 is a cross-sectioned-view, taken along the line 4-4 of FIG. 1.

FIG. 1 is a schematic perspective view showing an entire battery module according to an embodiment of the present disclosure, FIG. 2 is a schematic exploded perspective view showing the battery module according to an embodiment of the present disclosure, FIG. 3 is a diagram showing an interior of a case in the battery module according to an embodiment of the present disclosure, and FIG. 4 is a cross-sectioned view, taken along the line 4-4 of FIG. 1. In FIG. 3, the case is partially sectioned.

Referring to FIGS. 1 to 4, a battery module 10 according to an embodiment of the present disclosure includes a battery cell stack 100, a case 200 and a heat dissipation member 300.

The battery cell stack 100 may be configured so that a plurality of battery cells 110 are stacked therein (see FIG. 4). The battery cells 110 may have various structures, and the plurality of unit cells 110 may be stacked in various ways. The battery cell 110 may be configured so that a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 110 may have an electrode lead. The electrode lead is a type of terminal that is exposed to the outside and connected to an external device and may be made of a conductive material. The electrode lead may include a positive electrode lead and a negative electrode lead. The positive electrode lead and the negative electrode lead may be disposed in opposite directions with respect to the longitudinal direction of the battery cell 110, or the positive electrode lead and the negative electrode lead may be positioned in the same direction with respect to the longitudinal direction of the battery cell 110. The electrode lead may be electrically coupled to the bus bar.

The battery cell stack 100 may include a plurality of cartridges (not shown) for accommodating the battery cells 110. Each cartridge (not shown) may be fabricated by injection-molding plastic, and a plurality of cartridges (not shown) having an accommodation portion for accommodating the battery cell 110 may be stacked. A cartridge assembly in which a plurality of cartridges (not shown) are stacked may include a connector element or a terminal element. The connector element may include various types of electrical connecting components or connecting members for connecting to, for example, a battery management system (BMS) (not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside. Meanwhile, the battery cell 110 may have various shapes.

The battery cell stack 100 is accommodated in the case 200 (see FIG. 4). The case 200 entirely surrounds the battery cell stack 100 or the plurality of cartridges accommodating the battery cells 110, thereby protecting the battery cell stack 100 or the cartridge assembly from external vibration or shock.

The case 200 may be formed in a shape corresponding to the shape of the battery cell stack 100 or the cartridge assembly. For example, if the battery cell stack 100 or the cartridge assembly has a hexahedron shape, the case 200 may also have a hexahedron shape corresponding thereto. The case 200 may be manufactured, for example, by bending a plate made of metal or by a plastic injection. In addition, the case 200 may be manufactured integrally, or may be manufactured by combining separate plates. The case 200 may have a perforation (not shown) through which the connector element or the terminal element as described above may be exposed to the outside. That is, the connector element or the terminal element may be electrically connected to a predetermined external component or member, and the perforation may be formed in the case 200 so that the electrical connection is not disturbed by the case 200.

The case 200 may have an insert hole 210 so that a protrusion 320, explained later, of the heat dissipation member 300 may be inserted therein (see FIGS. 1 and 2), and may have a guide protrusion 230 so that a guide hole 311 of the heat dissipation member 300 may be guided (see FIGS. 2 and 3).

The heat dissipation member 300 may be applied in various ways to dissipate the heat generated in the battery cell stack 100. For example, the heat dissipation member 300 may be provided as a heatsink. The heat dissipation member 300 is inserted into the case 200 and supported in contact with the battery cell stack 100. In the case of a conventional battery module (not shown), battery cells (not shown) are inserted in a case (not shown), a heat dissipation member (not shown) is disposed under the battery cells to contact the battery cells, and bolts and nuts are used to fix the heat dissipation member. However, in the battery module 10 according to an embodiment of the present disclosure, the heat dissipation member 300 is firstly inserted to contact the case 200, and the battery cell stack 100 is inserted to contact the heat dissipation member 300 in a state where the heat dissipation member 300 is in contact with the case 200. Thus, the heat dissipation member 300 is supported by the battery cell stack 100, and bolts and nuts for fixing the heat dissipation member 300 are not needed.

The heat dissipation member 300 may include a base plate 310 and a protrusion 320. The base plate 310 may have various shapes and contact the battery cell stack 100 to emit heat generated from the battery cells 110. For this purpose, the base plate 310 may be configured so that a coolant may flow out after being introduced therein.

The base plate 310 may be inserted into the case 200 and contact one side of the case 200 at which the insert hole 210 is formed. Here, one side of the base plate 310 may contact the case 200, and the other side of the base plate 310 opposite to the one side may contact the battery cell stack 100 (see FIG. 4). That is, the base plate 310 may be interposed between the inner surface of the case 200 and the battery cell stack 100 to contact the inner surface of the case 200 and the battery cell stack 100, respectively, and thus the base plate 310 is supported by the battery cell stack 100. A cover (not shown) for supporting the battery cell stack 100 may be coupled to the case 200.

The heat dissipation member 300 may include one or more protrusions 320, and the protrusions 320 are coupled to the base plate 310 and inserted into the insert holes 210 formed in the case 200. That is, if the protrusion 320 is inserted into the insert hole 210 of the case 200, the base plate 310 contacts the inner surface of the case 200. Here, the protrusion 320 may have at least one step 328, a hooking groove 329 may be formed in the step 328, and a hook 220 may be formed in the insert hole 210 of the case 200 so as to be coupled to the hooking groove 329 of the protrusion 320. Here, the hook 220 may have various shapes. That is, the protrusion 320 may be inserted into the insert hole 210 and coupled to the case 200 by hooking or snap-fitting. However, it is also possible that a hook is formed at the protrusion 320 and a hooking groove is formed in the case 200. Since the base plate 310 of the heat dissipation member 300 is interposed between the case 200 and the battery cell stack 100 and supported by the battery cell stack 100, it is not necessary to provide a bolt and a nut for fixing the heat dissipation member 300. However, in order to increase the degree of fixation of the heat dissipation member 300, if the hook 220 is formed at the case 200 and coupled to the hooking groove 329 formed in the protrusion 320 by hooking, the heat dissipation member 300 is coupled and fixed at a portion where the protrusion 320 is formed, and is supported by the battery cell stack 100 at a portion where the heat dissipation member 300 is in contact with the battery cell stack 100. Thus, the heat dissipation member 300 may be sufficiently fixed even if bolts and nuts are not provided. For this reason, it is possible to reduce the cost required for manufacturing bolts and nuts, and the work of workers may be facilitated since the bolt-nut coupling process is eliminated.

Meanwhile, the protrusion 320 may function as an input port of the coolant flowing into the base plate 310 and an output port of the coolant flowing out of the base plate 310. That is, the protrusion 320 may be coupled to the case 200 by hooking to support the base plate 310, or may be used as a moving path of the coolant. If the protrusion 320 has only a function of simply supporting the base plate 310 by hooking, the number of the protrusions 320 may be just one or more. In this case, for the coolant to flow out from the base plate 310 after flowing into the base plate 310, an inlet and an outlet may be separately formed at the base plate 310.

However, if the protrusion 320 also has the function of a moving path of the coolant, two or more protrusions 320 may be provided. That is, it is desirable to provide at least two protrusions 320 because at least one coolant inlet and at least one coolant outlet are required. However, it is also possible that one protrusion 320 is provided to function as one of an inlet and an outlet, and an outlet or an inlet other than the protrusion 320 is formed at the base plate 310 to correspond to the protrusion 320 serving as an inlet or an outlet. If two protrusions 320 are provided, a coolant inlet 322 may be formed at a first protrusion 321 and connect to an inflow channel (not shown) so that the coolant may flow into the base plate 310, and a coolant outlet 326 may be formed at a second protrusion 325 and connected to an outflow channel (not shown) so that the coolant may flow out from the base plate 310. That is, the coolant flows from the inflow channel (not shown) into the base plate 310 through the coolant inlet 322 formed at the first protrusion 321 and flows from the base plate 310 to the outflow channel (not shown) through the coolant outlet 326 formed at the second protrusion 325.

The heat dissipation member 300 may be twisted or rotated while being inserted into the case 200, and thus be inserted into the case 200 in a direction different from the inserting direction. To prevent this, referring to FIGS. 2 and 3, at least one guide protrusion 230 may be formed at the case 200, and at least one guide hole 311 is formed in the base plate 310. That is, since the guide hole 311 formed in the base plate 310 is inserted along the guide protrusion 230 formed at the case 200, the base plate 310 may be inserted in a correct direction without being twisted or rotated while being inserted.

Hereinafter, the operation and effect of the battery module 10 according to an embodiment of the present disclosure will be described with reference to the drawings.

Referring to FIGS. 1 to 4, the insert hole 210 may be formed in the case 200, and the protrusion 320 protruding from the base plate 310 may be formed at the heat dissipation member 300. Since the heat dissipation member 300 is inserted into the case 200 and interposed between the inner surface of the case 200 and the battery cell stack 100, the heat dissipation member 300 may be supported by the battery cell stack 100. In addition, the hook 220 may be formed at the insert hole 210 of the case 200, the hooking groove 329 may be formed at the protrusion 320 of the heat dissipation member 300, and the protrusion 320 of the heat dissipation member 300 may be coupled to the case 200 by hooking or snap-fitting.

Since the heat dissipation member 300 may be supported by the battery cell stack 100 and the protrusion 320 may be coupled to the case 200 by hooking or snap-fitting in this way, the heat dissipation member 300 may be fixed in contact with the battery cell 110 even though a coupling member such as a bolt and a nut is not provided.

Meanwhile, a battery pack (not shown) according to an embodiment of the present disclosure may include one or more battery modules 10 according to an embodiment of the present disclosure as described above. Also, in addition to the battery modules 10, the battery pack (not shown) may further includes a case for accommodating the battery modules 10, and various devices for controlling charge and discharge of the battery modules 10, such as a BMS, a current sensor, a fuse, and the like.

Meanwhile, a vehicle (not shown) according to an embodiment of the present disclosure may include the battery module 10 or the battery pack (not shown) described above, and the battery pack (not shown) may include the battery module 10. In addition, the battery module 10 according to an embodiment of the present disclosure may be applied to the vehicle (not shown), for example, a predetermined vehicle (not shown) provided to use electricity such as an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled

What is claimed is:

1. A battery module, comprising:
    a battery cell stack having a plurality of battery cells stacked;
    a case configured to accommodate the battery cell stack, the case having at least one insert hole formed therein; and
    a heat dissipation member inserted into the case and supported in contact with the battery cell stack, the heat dissipation member including:
        a base plate inserted into the case and contacting one side of the case at which the at least one insert hole is formed; and
        at least one protrusion coupled to the base plate and inserted into the at least one insert hole.

2. The battery module according to claim 1, wherein a first side of the base plate is in contact with the case, and a second side of the base plate opposite to the first side is in contact with the battery cell stack.

3. The battery module according to claim 1, wherein in the heat dissipation member, said at least one protrusion includes at least two protrusions, and
    wherein a coolant inlet is formed at a first protrusion of the at least two protrusions and connected to an inflow channel so that a coolant flows into the base plate, and a coolant outlet is formed at a second protrusion of the at least two protrusions and connected to an outflow channel so that the coolant flows out from the base plate.

4. A battery module, comprising:
    a battery cell stack having a plurality of battery cells stacked;
    a case configured to accommodate the battery cell stack, the case having at least one insert hole formed therein; and
    a heat dissipation member inserted into the case and supported in contact with the battery cell stack, the heat dissipation member including:
        a base plate; and
        at least one protrusion coupled to the base plate and inserted into the at least one insert hole,
    wherein the at least one protrusion is inserted into the at least one insert hole and coupled to the case by hooking or snap-fitting.

5. The battery module according to claim 4, wherein at least one step is formed at the at least one protrusion, a hooking groove is formed at the step, and a hook is formed at the case so as to be coupled to the hooking groove.

6. A battery module, comprising:
    a battery cell stack having a plurality of battery cells stacked;
    a case configured to accommodate the battery cell stack, the case having at least one insert hole formed therein; and
    a heat dissipation member inserted into the case and supported in contact with the battery cell stack, the heat dissipation member including:
        a base plate; and
        at least one protrusion coupled to the base plate and inserted into the at least one insert hole,
    wherein at least one guide protrusion is formed at the case, and
    wherein at least one guide hole is formed in the base plate to guide the base plate to be inserted along the at least one guide protrusion.

7. A battery pack comprising a battery module defined in claim 1.

8. A vehicle comprising a battery module defined in claim 1.

9. A battery pack comprising a battery module defined in claim 4.

10. A vehicle comprising a battery module defined in claim 4.

11. A battery pack comprising a battery module defined in claim 6.

12. A vehicle comprising a battery module defined in claim 6.

* * * * *